(12) United States Patent
Purnadi et al.

(10) Patent No.: US 7,995,562 B2
(45) Date of Patent: Aug. 9, 2011

(54) SYSTEM AND METHOD TO TRIGGER A MOBILE DEVICE IN DIFFERENT DOMAINS BASED ON UNSUCCESSFUL INITIALIZATION OR HANDOVER

(75) Inventors: Rene W. Purnadi, Coppell, TX (US); M. Khaledul Islam, Ottawa, CA (US); Adrian Buckley, Tracy, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 326 days.

(21) Appl. No.: 11/679,044

(22) Filed: Feb. 26, 2007

(65) Prior Publication Data

US 2008/0205413 A1   Aug. 28, 2008

(51) Int. Cl.
*H04W 4/00* (2009.01)
*H04W 36/00* (2009.01)
*H04L 12/66* (2006.01)
*G06F 15/16* (2006.01)

(52) U.S. Cl. ..... 370/352; 370/331; 455/436; 455/552.1; 709/228

(58) Field of Classification Search ................ 370/331
See application file for complete search history.

(56) References Cited

U.S. PATENT DOCUMENTS

| 6,304,565 | B1 | 10/2001 | Ramamurthy |
| 6,567,667 | B1 | 5/2003 | Gupta et al. |
| 6,681,105 | B1 * | 1/2004 | Balbi ........................... 455/406 |
| 6,937,704 | B1 | 8/2005 | Meijer et al. |
| 7,010,299 | B2 | 3/2006 | Wilson |
| 7,151,931 | B2 | 12/2006 | Tsao et al. |
| 7,546,125 | B2 | 6/2009 | Sharma et al. |
| 2002/0024943 | A1 | 2/2002 | Karaul et al. |
| 2002/0085516 | A1 | 7/2002 | Bridgelall |
| 2003/0134650 | A1 | 7/2003 | Sundar et al. |
| 2003/0139180 | A1 | 7/2003 | McIntosh et al. |
| 2003/0139184 | A1 * | 7/2003 | Singh et al. ................... 455/436 |
| 2003/0152048 | A1 | 8/2003 | Soininen et al. |
| 2004/0001474 | A1 | 1/2004 | Simelius et al. |

(Continued)

FOREIGN PATENT DOCUMENTS

KR   20010030725 A   4/2001

(Continued)

OTHER PUBLICATIONS

3GPP TS 24.229v6.0.0; 3rd Generation Partnership Project; Technical Specification Group Core Network; IP Multimedia Call Control Protocol based on Session Initiation Protocol (SIP) and Session Description Protocol (SDP); Stage 3, Release 6; Sep. 2003; 257 pages (submitted in three parts).

(Continued)

*Primary Examiner* — Andrew Chriss
(74) *Attorney, Agent, or Firm* — Conley Rose, P.C.; J. Robert Brown, Jr.

(57) ABSTRACT

A system to promote communication in a second domain responsive to a failure in a first domain. The system includes a first domain for communicating, and a second domain for communicating. The system includes a rejection message and a mobile device. The rejection message transmitted upon a failure of a call in the first domain. The mobile device configured to communicate in both the first domain and the second domain. The mobile device configured to attempt the call in the second domain responsive to receiving the rejection message in the first domain.

21 Claims, 8 Drawing Sheets

U.S. PATENT DOCUMENTS

| | | | |
|---|---|---|---|
| 2004/0264410 A1 | 12/2004 | Sagi et al. | |
| 2005/0030928 A1 | 2/2005 | Virtanen et al. | |
| 2005/0041640 A1 | 2/2005 | Nasielski et al. | |
| 2005/0047398 A1 | 3/2005 | Yeom | |
| 2005/0083899 A1 | 4/2005 | Babbar et al. | |
| 2005/0083909 A1 | 4/2005 | Kuusinen et al. | |
| 2005/0117576 A1* | 6/2005 | McDysan et al. | 370/389 |
| 2005/0154793 A1* | 7/2005 | Khartabil | 709/227 |
| 2005/0163078 A1 | 7/2005 | Oba et al. | |
| 2005/0190747 A1 | 9/2005 | Sindhwani et al. | |
| 2005/0220079 A1 | 10/2005 | Asokan | |
| 2005/0238041 A1 | 10/2005 | Hsu et al. | |
| 2005/0265284 A1 | 12/2005 | Hsu et al. | |
| 2006/0068778 A1* | 3/2006 | Della-Torre | 455/432.1 |
| 2006/0094396 A1* | 5/2006 | Raghuram et al. | 455/404.1 |
| 2006/0121916 A1 | 6/2006 | Aborn et al. | |
| 2006/0159059 A1 | 7/2006 | Vaittinen et al. | |
| 2006/0268840 A1 | 11/2006 | Xu et al. | |
| 2006/0276192 A1 | 12/2006 | Dutta et al. | |
| 2006/0286984 A1 | 12/2006 | Bonner | |
| 2007/0015510 A1* | 1/2007 | Xiang | 455/436 |
| 2007/0022200 A1 | 1/2007 | Benkert et al. | |
| 2007/0049281 A1 | 3/2007 | Chen et al. | |
| 2007/0117588 A1 | 5/2007 | Uehara et al. | |
| 2007/0183410 A1 | 8/2007 | Song et al. | |
| 2008/0049675 A1 | 2/2008 | Burgan et al. | |
| 2008/0056236 A1 | 3/2008 | Barclay et al. | |
| 2008/0102844 A1 | 5/2008 | Zhu et al. | |
| 2008/0112392 A1 | 5/2008 | Mansfield | |
| 2008/0119165 A1 | 5/2008 | Mittal et al. | |
| 2008/0186953 A1 | 8/2008 | Buckley et al. | |
| 2008/0198764 A1* | 8/2008 | Keller | 370/254 |
| 2009/0156215 A1* | 6/2009 | Pitkamaki | 455/437 |
| 2009/0233600 A1* | 9/2009 | Johansson et al. | 455/435.2 |
| 2009/0323623 A1 | 12/2009 | Julka et al. | |
| 2010/0110978 A1* | 5/2010 | Falkena et al. | 370/328 |

FOREIGN PATENT DOCUMENTS

| | | |
|---|---|---|
| KR | 20050012255 A | 1/2005 |
| KR | 20060013951 A | 2/2006 |
| KR | 20070067234 A | 6/2007 |
| WO | 2005051025 A1 | 6/2005 |
| WO | 2006057924 A2 | 6/2006 |
| WO | 2007009348 A1 | 1/2007 |
| WO | 2007079578 A1 | 7/2007 |

OTHER PUBLICATIONS

EP Examination Report; EP Patent Application No. 07108763.9; Feb. 3, 2009; 3 pgs.

PCT International Search Report; PCT Application No. PCT/CA2008/000072; Apr. 29, 2008; 3 pgs.

PCT Written Opinion of the International Searching Authority; PCT Application No. PCT/CA2008/000072; Apr. 29, 2008; 5 pgs.

European Search Report; EP Application No. EP07108763.9; Sep. 25, 2007; 7 pgs.

3GPP TS 24.008 V7.6.0; 3rd Generation Partnership Project: Technical Specification Group Core Network and Terminals; Mobile Radio Interface Layer 3 Specification; Core Netowrk Protocols; Stage 3; Dec. 2006; 539 pgs.

3GPP TS 24.206 V7.0.1; 3rd Generation Partnership Project; Technical Specification Group Core Network and Terminals; Voice Call Continuity between the Circuit-Switched (CS) domain and the IP Multimedia Core Network (CN) IMS subsystem; Stage 3; Jan. 2007; 112 pgs.

3GPP TS 23.206 V7.2.0; 3rd Generation Partnership Project; Technical Specification Group Services and System Aspects; Voice Call Continuity (VCC) between Circuit Switched (CS) and IP Multimedia Subsystem (IMS); Stage 2; Mar. 2007; 37 pgs.

Foreign Communication From a Counterpart Application; EP Application No. 07108763.9; Examination Report Dated Nov. 3, 2010; 3 pgs.

Purnadi, Rene W., et al.; U.S. Appl. No. 11/679,032; Title: System and Method of User-Directed Dynamic Domain Selection; Filing Date: Feb. 26, 2007.

Buckley, Adrian; U.S. Appl. No. 11/837,273; Title: Systems and Methods for Defining Mult-Domain Wireless Device Bahvior for Two or More Calls; Filing Date: Aug., 10 2007.

3GPP TS 23.206 v7.1.0; 3rd Generation Partnership Project; "Technical Specification Group Services and System Aspects, Voice Call Continuity (VCC) between Circuit Switched (CS) and IP Multimedia Subsystem (IMS)"; Stage 2; Dec. 2006, 35 pages.

3GPP TSG SA WG2 #50, Research in Motion, "NeDS Routing Decision Based on Operator and User Policy," Jan. 16-20, 2006, S2-060092, Budapest, Hungary, 3 pages.

3GPP TSG-SA WG2 Meeting #46, Ericsson, "Service Continuity—Network Domain Selection", Tdoc S2-050995, Athens, Greece, May 9-13, 2005, 2 pages.

3GPP TSG SA WG2 Architecture - S2#51, LG Electronics, RIM, "VCC Transmission of User Preferences and Operator Policy," Feb. 13-17, 2006, S2-060950, Denver, Colorado, 2 pages.

Jones, Dan, Unstrung News Analysis; Cisco, Nokia Team on FMC; Apr. 27, 2006; 2 pages.

Jones, Dan, Unstrung News Analysis, Cisco Speaks Enterprise; Apr. 25, 2006; 4 pages.

Nobel, Carmen, Unstrung News Analysis, Cisco/Moto Deal Dies; Apr. 26, 2006; 2 pages.

Springham, Justing; Moto Ramps Up Convergence; May 10, 2005; 2 pages.

News Wire Feed; Moto, Cisco Go Dualmode; Jul. 26, 2005; 2 pages.

First Action Interview Office Action dated Apr. 15, 2010; U.S. Appl. No. 11/679,032; Filed Feb. 26, 2007; 15 pages.

Office Action dated Jul. 22, 2010; U.S. Appl. No. 11/679,032; Filed Feb. 26, 2007; 30 pages.

Office Action dated Jan. 6, 2011; U.S. Appl. No. 11/679,032; Filed Feb. 26, 2007; 14 pages.

Office Action dated Feb. 19, 2010; U.S. Appl. No. 11/837,273; Filed Aug. 10, 2007; 16 pages.

Final Office Action dated Aug. 18, 2010; U.S. Appl. No. 11/837,273; Filed Aug. 10, 2007; 11 pages.

Office Action dated Nov. 10, 2010; U.S. Appl. No. 11/837,273; Filed Aug. 10, 2007; 8 pages.

European Search Report; EP Application No. 07108761.3; Oct. 4, 2007; 7 pages.

EP Examination Report; EP Patent Application No. 07108761.3; Jan. 30, 2009; 4 pages.

PCT International Search Report, PCT Application No. PCT/CA2008/000280; May 22, 2008; 3 pages.

PCT Written Opinion of the International Searching Authority; PCT Application No. PCT/CA2008/000280; May 22, 2008; 4 pages.

Korean Office Action; Notice Requesting Submission of Opinion; Korean Application No. 10-2009-7019794; Mar. 8, 2011; 7 pages.

International Preliminary Report on Patentability; PCT Application No. PCT/CA2008/000072; Jun. 12, 2008; 10 pages.

Korean Office Action; Notice Requesting Submission of Opinion; Korean Application No. 10-2009-7019363; Mar. 17, 2011; 6 pages.

European Search Report; EP Application No. 07115354.8; Dec. 27, 2007; 9 pages.

European Search Report; EP Application No. 07115354.8; Nov. 3, 2008; 5 pages.

EP Examination Report; EP Patent Application No. 07115354.8; Sep. 2, 2010; 4 pages.

PCT International Search Report, PCT Application No. PCT/US2008/069814; Jan. 9, 2009; 3 pages.

PCT Written Opinion of the International Searching Authority, PCT Application No. PCT/US2008/069814; Jan. 9, 2009; 8 pages.

International Preliminary Report on Patentability, PCT Application No. PCT/US2008/069814; Nov. 27, 2009; 5 pages.

3GPP TR 23.818 v0.9.0; 3rd Generation Partnership Project; "Technical Specification Group Service and Architecture, Optimisations and Enhancements for Realtime IMS Communication"; Jan. 2007; 66 pages.

Final Office Action dated May 5, 2011; U.S. Appl. No. 11/679,032; Filed Feb. 26, 2007; 23 pages.

Final Office Action dated May 26, 2011; U.S. Appl. No. 11/837,273; Filed Aug. 10, 2007; 21 pages.

* cited by examiner

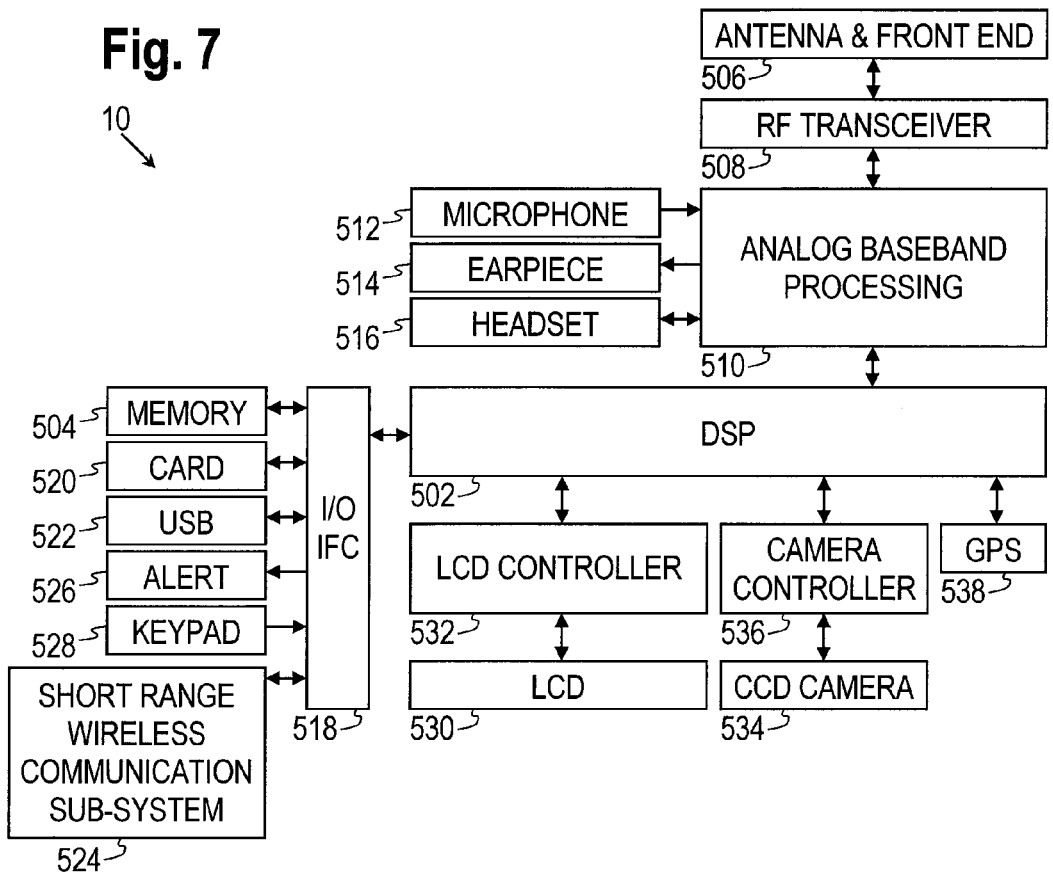
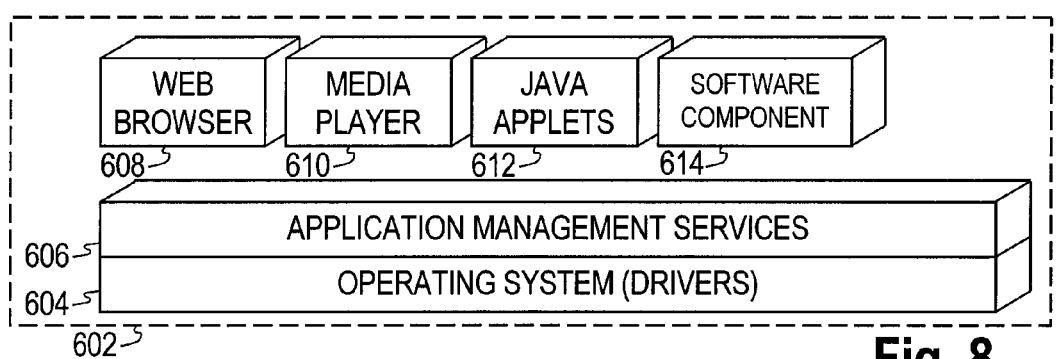

SYSTEM AND METHOD TO TRIGGER A MOBILE DEVICE IN DIFFERENT DOMAINS BASED ON UNSUCCESSFUL INITIALIZATION OR HANDOVER

BACKGROUND

Easily transportable devices with wireless telecommunications capabilities, such as mobile telephones, personal digital assistants, handheld computers, and similar devices, will be referred to herein as mobile devices. Some mobile devices communicate in a circuit switching mode, wherein a dedicated communication path exists between two devices. For the duration of a call, all data exchanged between the two devices travels along the single path. An example of a telecommunications protocol that uses circuit switching is the Global System for Mobile Communications (GSM).

Some mobile devices also have the capability to communicate in a packet switching mode. In packet switching, a data stream is divided into packets that are given unique identifiers. The packets might then be transmitted from a source to a destination along different paths and might arrive at the destination at different times. Upon reaching the destination, the packets are reassembled into their original sequence based on the identifiers. An example of a telecommunications protocol that uses packet switching is the Session Initiation Protocol (SIP).

Communications that take place via circuit switching can be said to occur in the circuit switching domain and communications that take place via packet switching can be said to occur in the packet switching domain. Mobile devices that can communicate in only the circuit switching domain or only the packet switching domain can be referred to as single domain devices or single mode devices. Mobile devices that can communicate in both the circuit switching domain and the packet switching domain can be referred to as dual domain devices or dual mode devices. A communications connection in the circuit switched domain or in the packet switched domain can be referred to as a call or a session.

The geographic area served by a traditional wireless telecommunications tower, base station, and related components may be referred to as a cell. The geographic area served by a wireless computer network may be referred to as a hotspot. As used herein, the term "zone" will refer to a cell, a hotspot, or both.

The automated activities involved in setting up wireless voice communications between two devices can be referred to as call initiation, call initialization, call setup, or other terms. The automated activities involved in passing control of a call or session from one zone to another can be referred to as call handover, call handoff, call transfer, or other terms. Call setup and call handover will be referred to herein collectively as a call, a call session, or a call attempt.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a block diagram of a mobile device operable for some of the various embodiments of the disclosure.

FIG. 8 is a diagram of a software environment that may be implemented on a mobile device operable for some of the various embodiments of the disclosure.

DETAILED DESCRIPTION

Figure 1A:
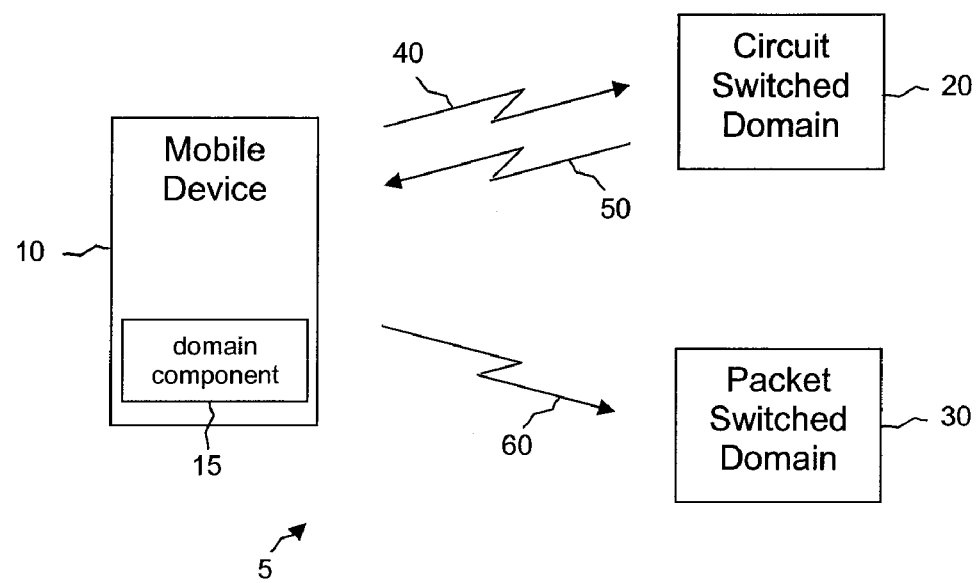
FIGS. 1a and 1b are block diagrams of a system including a mobile device operable to communicate in the circuit switched domain and in the packet switched domain according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When a mobile device attempts to set up a call, or when an attempt is made to hand a call off from one zone to another, the attempt could be rejected for various reasons. For example, for a circuit switched call, the attempt could be rejected because all of the radio channels over which the call might be placed are in use. For a packet switched call, the attempt could be rejected because network resources are overloaded. Other reasons for the rejection of a call initiation or a call handover will be well known to one of skill in the art.

When such a call session is rejected, a rejection message containing a reason for the rejection is typically generated. In previous systems, regardless of the rejection reason, further attempts at the call session might automatically be made in the domain in which the original attempt was made. However, as described below, such repeated call attempts might not always be desirable. Alternatively, in previous systems, further call attempts might not be made even when the reason for rejection might suggest that further attempts at the call might be desirable.

In an embodiment, when a call in a first domain is rejected, the rejection message sent to the mobile device that made the call attempt can allow the mobile device to reattempt the call in a second domain. In one embodiment, the rejection message can contain a suggestion that the call be reattempted in the second domain. The reattempt could be considered network-initiated in this case. In another embodiment, the mobile device can have the capability to interpret the rejection reason in the rejection message and, based on the rejection reason, can make an appropriate determination whether to reattempt the call in the second domain. The reattempt could be considered device-initiated in this case.

As an example, if the user of a dual domain mobile device attempts to initiate a call in the circuit switched domain and the call is rejected, another attempt to initiate the call might automatically occur in the packet switched domain using SIP-based signaling or another signaling system that can set up a session in that domain. Alternatively, when a call initiated in the circuit switched domain is rejected, a message containing the reason for the rejection might be sent to the mobile device and the rejection reason might be presented to the user. The user might then be given the option to attempt the call again in the packet switched domain or the mobile device might automatically reattempt the call in the packet switched domain. Conversely, if the call is attempted and rejected in the packet switched domain, a rejection message that allows a reattempt of the call in the circuit switched domain might be sent to the mobile device.

If the rejection occurs during handover, an automatic attempt could be made to perform the handover in the domain different from the domain in which the initial attempt occurred. Alternatively, a message might be sent to the mobile device asking the user if the call should be handed over to a different domain. The user might then select whether to allow the handover. If the user does not make a selection, a default action regarding the handover might be taken.

In an embodiment, modifications are made to the existing rejection messages used in the various data transmission protocols such as GSM, SIP, Code Division Multiple Access (CDMA), the Universal Mobile Telecommunications System (UMTS), and others. Under certain circumstances, the modified rejection messages can cause or allow a rejected activation of a call to be reattempted in another domain.

When a rejection occurs because of technology-related circumstances, such as signal failure or overloaded network resources, the reattempt will typically be allowed. However, if a rejection occurs because of user-related circumstances, the reattempt might not be allowed. For example, if the user's service has been terminated because the user has not paid a bill, the user's attempt to initiate a call will result in a rejection message indicating that the rejection occurred because of non-payment of a bill. Based on such a rejection message, the call would not be reattempted in a different domain. In another example, if the user's mobile device is stolen, the user can request that no calls be allowed from the mobile device. If the person in possession of the mobile device attempts to initiate a call, a rejection message that does not allow or prompt a reattempt of the call in a different domain can be sent to the mobile device.

It is well known in the art that mobile devices undergo a registration process in which they specify their capabilities. In this way, a telecommunications network and/or a computer network with which a mobile device might communicate can be aware of whether a mobile device is a dual mode device or a single mode device. In an embodiment, rejection messages that allow a reattempt of the activation of a call in another domain are sent only to devices that have identified themselves as dual mode devices. Single mode devices are sent the traditional rejection messages that do not include a suggestion to reattempt initialization in another domain. In other embodiments, the message might be placed in a field or transmitted in a manner that is ignored by legacy devices and used only by dual mode devices, for example.

In one embodiment, a system is provided to promote communication in a second domain responsive to a failure in a first domain. The system includes a first domain for communicating, and a second domain for communicating. The system includes a rejection message and a mobile device. The rejection message transmitted upon a failure of a call in the first domain. The mobile device configured to communicate in both the first domain and the second domain. The mobile device configured to attempt the call in the second domain responsive to receiving the rejection message in the first domain.

In another embodiment, a dual mode mobile device is provided. The device includes a processor programmed, responsive to receiving a rejection message when a call fails in a first domain, to attempt the call in a second domain.

In another embodiment, a method for communicating in a second domain responsive to failure in a first domain is provided. The method includes attempting a call session in the first domain, rejecting the attempt, transmitting a rejection message that includes a portion to promote attempting the call session in the second domain, and attempting the call session in the second domain responsive to receiving the rejection message.

In another embodiment, a method in a mobile device for communicating in a second domain responsive to failure in a first domain is provided. The method includes attempting a call session in the first domain and receiving a rejection message indicative of a failure attempt of the call session in the first domain. The rejection message has a portion to promote attempting the call session in the second domain. The method further includes attempting the call session in the second domain responsive to receiving the rejection message.

FIG. 1a is a block diagram of an embodiment of a system 5 that includes a mobile device 10, a circuit switched domain 20, and a packet switched domain 30. The mobile device 10 is capable of communicating in both the circuit switched domain 20 and the packet switched domain 30. The mobile device 10 includes a domain component 15 that is capable of attempting a call in a second domain when the call fails in a first domain.

When the mobile device 10 sends a message 40 attempting to set up a call in the circuit switched domain 20, a message 50 might be sent to the mobile device 10 indicating that the call was rejected. In one embodiment, the message 50 contains a suggestion that the call can be reattempted in the packet switched domain 30. The domain component 15 receives the message 50 and recognizes the suggestion to reattempt the call in the packet switched domain 30. The domain component 15 then causes the mobile device 10 to send a message 60 attempting the call in the packet switched domain 30. The domain component 15 might automatically cause the mobile device 10 to attempt the call in the packet switched domain 30 upon receiving the rejection message 50. Alternatively, the mobile device 10 might alert the user of the mobile device 10 of the option of reattempting the call in the packet switched domain 30. The user might then choose to reattempt the call in the packet switched domain 30 or might choose not to reattempt the call.

In another embodiment, the message 50 does not contain a suggestion that the call can be reattempted in the packet switched domain 30, but merely contains a reason for the rejection of the call. In this case, the domain component 15 can be capable of interpreting the rejection reason and, based on the rejection reason, determining whether the call should be reattempted in the other domain. The call might be reattempted automatically or upon an input from the user or a reattempt might not be performed.

Figure 1B:
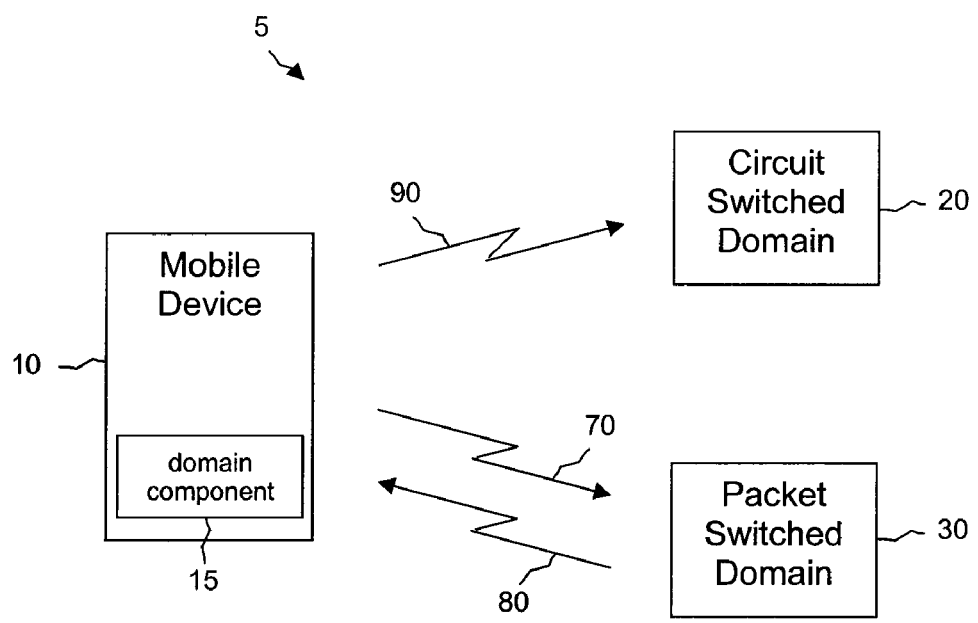

FIG. 1b is a block diagram of another embodiment of the system 5. In this case, the mobile device 10 sends a message 70 attempting to initiate a call in the packet switched domain 30. If a message 80 is sent to the mobile device 10 indicating that the call was rejected, the message 80 can contain a rejection reason that can allow a reattempt of the call in the circuit switched domain 20. The domain component 15 can recognize a suggestion for a reattempt in the rejection message or can recognize the rejection reason in the rejection message. The domain component 15 might then cause the mobile device 10 to send a message 90 to attempt the call in the circuit switched domain 20.

FIGS. 1a and 1b might also apply to the handover of a call when the mobile device 10 moves from one zone to another. In such situations, a call is typically handed over within a single domain. In the current embodiments, when a handover within a domain fails or is rejected, a handover to another domain can be attempted. For example, in FIG. 1a, message 40 might represent a radio signal strength measurement report in the current and neighboring zones within the circuit switched domain 20. Message 50 might be a rejection message in the form of a handover command message indicating that the handover failed within the circuit switched domain and suggesting that the call handover be reattempted in the packet switched domain 30. Message 60 might then represent an attempt to perform the handover in the packet switched domain 30. Again, the reattempt can be made automatically by the mobile device 10 or upon a confirmation from the user that the reattempt is desired.

In FIG. 1a or FIG. 1b, the rejection of the call activation might have a user-related cause. For example, the user may have failed to pay a bill or the user may have requested the suspension of service because the mobile device 10 has been stolen. In such cases, the rejection message 50 or the rejection message 80 sent to the mobile device 10 might not include a suggestion to reattempt the activation in a different domain since the call would be rejected in the other domain as well. Alternatively, the domain component 15 might have the capability of interpreting the rejection reason included in the rejection message 50 or the rejection message 80. The domain component 15 might then allow a reattempt at activation when the rejection reason indicates that the call might be successful in another domain and prevent a reattempt when the rejection reason indicates the call would fail in the other domain as well.

The rejection message 50 or the rejection message 80 might include a field that allows a telecommunications operator to provide information to the mobile device 10 and/or the user. The field might contain a cause value that indicates a reason for the rejection or generic text that indicates a reason for the rejection. Alternatively, the field might contain free form text that provides more information about the reason for the rejection.

Figure 2:
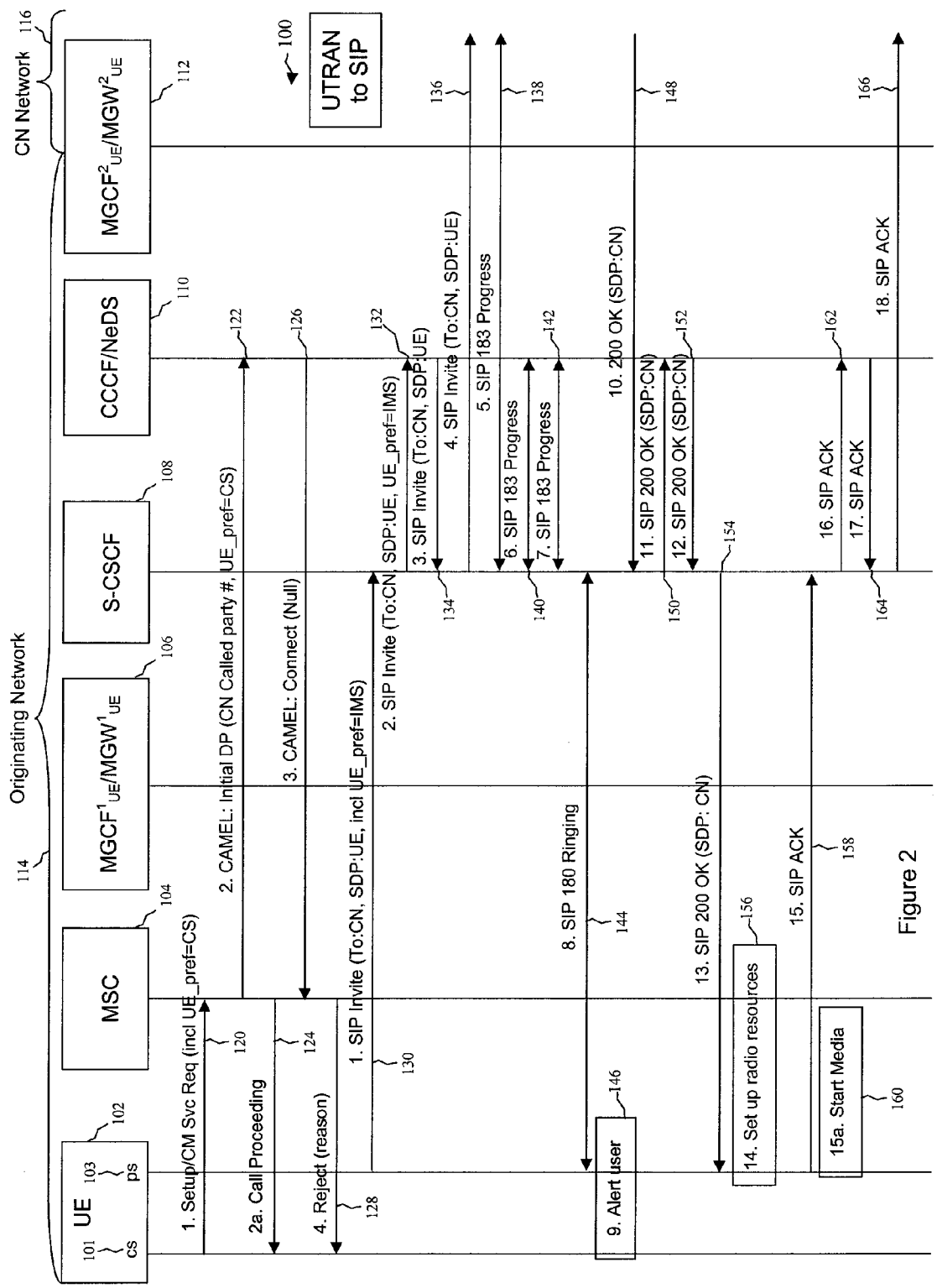
FIG. 2 is a call flow diagram for a call that is initiated in the circuit switched domain and reattempted in the packet switched domain according to an embodiment of the disclosure.

FIG. 2 is a call flow diagram 100 depicting an example of a series of events that might occur when a call is attempted in the circuit switched domain, rejected, and then reattempted in the packet switched domain. In this example, it is assumed that voice call continuity (VCC) technology is in use as per 3GPP Technical Specifications 23.206 and 24.206. It is well known in the art that VCC allows the circuit switched and packet switched domains to be bridged. That is, when VCC is in use for a call, the call can be transferred from the circuit switched domain to the packet switched domain and vice versa. A call that might be transferred between the circuit switched domain and the packet switched domain is typically anchored in a component that acts as a VCC server. During call setup, a registration process takes place in which the mobile device specifies that it is capable of placing both circuit switched calls and packet switched calls and in which the component that will act as the VCC anchor is specified.

In the embodiment of FIG. 2, the protocol used for the call attempt in the circuit switched domain is 3GPP circuit switching-based signaling according to 3GPP Technical Specification 24.008 and the protocol used for the call attempt in the packet switched domain is SIP. Other circuit switched protocols and/or packet switched protocols could be used in other embodiments. In the diagram, a mobile device is referred to as user equipment (UE) 102. The UE 102 is capable of operating in either the circuit switched domain or the packet switched domain and therefore has a circuit switched portion 101 and a packet switched portion 103. Other components involved in the call include a mobile switching center (MSC) 104, a first media gateway control function/media gateway (MGCF/MGW) 106, a serving call session control function (S-CSCF) 108, a call continuity control function/network domain selector (CCCF/NeDS) 110, and a second MGCF/MGW 112.

The first MGCF/MGW 106 and the second MGCF/MGW 112 translate messages between the circuit switched domain and the packet switched domain. The S-CSCF 108 is a packet switching-based component that can be considered a SIP server. The CCCF/NeDS 110 acts as a VCC server and is the component in which a call that might use both the circuit switched domain and the packet switched domain can be anchored. The functional entities in the CCCF/NeDS 110 may include the following: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D), which form a "VCC Application".

The UE 102, the MSC 104, the first MGCF/MGW 106, the S-CSCF 108, and the CCCF/NeDS 110 can be considered part of an originating network 114. That is, a calling party might attempt to place a call through the components in the originating network 114. The second MGCF/MGW 112, together with other components not shown, might be part of a corresponding node (CN) network 116. That is, the CN network 116 is the terminating network or the network through which a called party might receive a call.

At event 120, the circuit switched portion 101 of the UE 102 begins the initiation of a call by sending a Setup message to the MSC 104. At event 122, the MSC 104 sends a Customized Applications for Mobile network Enhanced Logic (CAMEL) initialization message to the CCCF/NeDS 110, requesting a connection to the called party. The CCCF/NeDS 110 selects the domain in which the call will be attempted based on operator policy and/or user preferences. In this case, it has been specified that the call will be initiated in the circuit switched domain.

At event 124, the MSC 104 sends a message to the circuit switched portion 101 of the UE 102 indicating that the call is proceeding. At event 126, the CCCF/NeDS 110 sends a CAMEL Connect (Null) message to the MSC 104 indicating that the call has been rejected. The MSC 104 then, at event 128, sends a Reject message to the circuit switched portion 101 of the UE 102.

It is well known in the art that a rejection message, such as the 3GPP-based rejection message shown at event 128, can include a reason for the rejection of a call. In previous systems, when a mobile device received a rejection message, further attempts to connect the rejected call might not be made. In other previous systems, further attempts to connect a rejected call might be made in the same domain in which the original call was attempted even though for technical reasons the call is not likely to succeed.

In the current embodiments, for certain rejection reasons, a call that has been rejected in a first domain might be reattempted in another domain. For example, if a call setup or handover fails in the circuit switched domain because of a technology-related reason, such as a lack of a radio channel, the call might be attempted again in the packet switched domain. In an embodiment, the rejection message sent to a mobile device can contain a suggestion that the call can be reattempted in a different domain based on the reason for the failure. The mobile device can have the capability of receiving the rejection message and allowing or disallowing a reattempt of the call based on the presence or absence of such a suggestion. Alternatively, the mobile device can have the capability of allowing or disallowing a reattempt of the call based on its interpretation of the rejection message. The mobile device might automatically attempt the call in a different domain or the mobile device might present a message to the user asking if the call should be attempted in a different domain. The user might then provide an input to the mobile device specifying whether or not the call should be reattempted in a different domain.

More specifically, returning to FIG. 2, the failure cause parameter in the Reject message depicted at event 128 can be modified to include a suggestion to reattempt the call in the packet switched domain. If the UE 102, at event 128, receives a suggestion to reattempt the call, an automatic or user-initiated attempt to place the call in the packet switched domain is made at event 130. In this embodiment, the packet switched portion 103 of the UE 102 sends a SIP Invite message to the S-CSCF 108 at event 130. In other embodiments, other types packet switched calls could be initiated at this point.

SIP Invite messages are then exchanged between the S-CSCF 108 and the CCCF/NeDS 110 at events 132 and 134. The initialization of the CCCF/NeDS 110 as the VCC anchor for the call also occurs at event 132. At event 136, the S-CSCF 108 sends a SIP Invite message to the called party's network (i.e., the CN network 116) via the second MGCF/MGW 112. At event 138, SIP Progress messages are exchanged between the S-CSCF 108 and the CN network 116. SIP Progress messages are then exchanged between the S-CSCF 108 and the CCCF/NeDS 110 at events 140 and 142.

At event 144, SIP Ringing messages are exchanged between the S-CSCF 108 and the packet switched portion 103 of the UE 102. The user of the UE 102 is then alerted at event 146. The alert is typically a ring back tone or similar signal to indicate that the called party's device is ringing. When the called party answers the call, a SIP OK message is sent from the CN network 116 to the S-CSCF 108 at event 148. SIP OK messages are then exchanged between the S-CSCF 108 and the CCCF/NeDS 110 at events 150 and 152 and a SIP OK message is sent from the S-CSCF 108 to the packet switched portion 103 of the UE 102 at event 154.

At event 156, the radio resources needed to carry out the call are set up. The packet switched portion 103 of the UE 102 then sends a SIP Acknowledgement message to the S-CSCF 108 at event 158. At event 160, the media for the call start to be exchanged. For example, for a voice call, data packets containing voice data would begin to be exchanged. For a multimedia call, video data, data files, or other types of data might be exchanged. At events 162 and 164, the S-CSCF 108 and the CCCF/NeDS 110 exchange SIP Acknowledgement messages. A SIP Acknowledgement message is sent from the S-CSCF 108 to the CN network 116 at event 166.

One of skill in the art will recognize that the actions depicted at events 120 through 128 are typical actions that might occur for the rejection of a call attempted according to the UTRAN (UTMS Terrestrial Radio Access Network) protocol. Similarly, the actions depicted at events 130 through 166 are typical actions that might occur when a SIP-based call is attempted and accepted. However, the current system provides for prompting the SIP call depicted at event 130 after the rejection of the UTRAN call depicted at event 128, based on certain rejection reasons.

Figure 3:
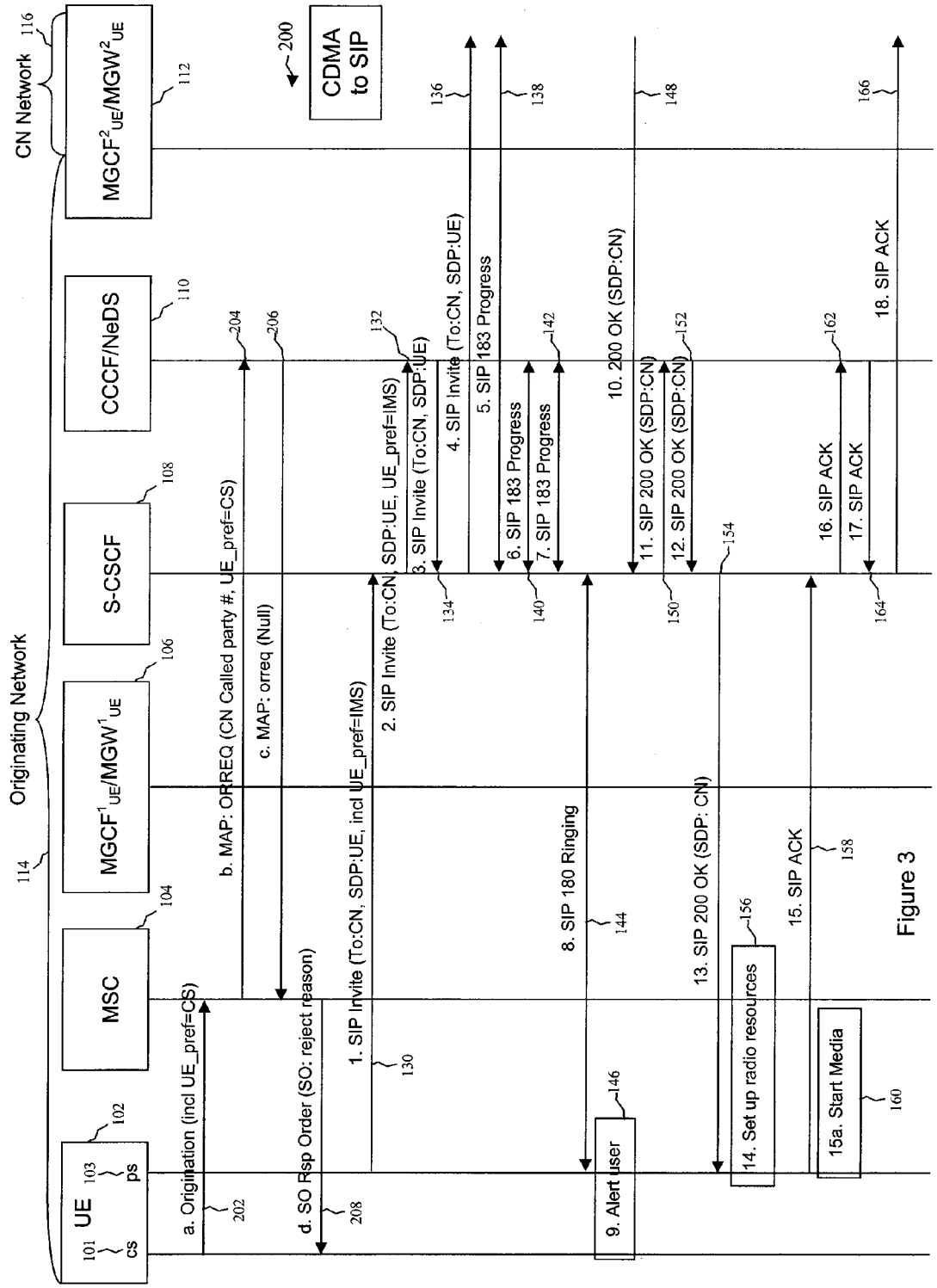
FIG. 3 is a call flow diagram for another call that is initiated in the circuit switched domain and reattempted in the packet switched domain according to an embodiment of the disclosure.

FIG. 3 is a call flow diagram 200 depicting another example of a series of events that might occur when a call is attempted in the circuit switched domain, rejected, and then reattempted in the packet switched domain. In this embodiment, the protocol used for the call attempt in the circuit switched domain is based on the signaling methods in a cdma2000 radio access network as defined in 3GPP2 C.S0005 (TIA-2000-5). The protocol used for the call attempt in the packet switched domain is again SIP. As in FIG. 2, the UE 102, the MSC 104, the first MGCF/MGW 106, the S-CSCF 108, and the CCCF/NeDS 110 can be considered part of the originating network 114 (the calling party's network). The called party might receive a call from the originating network 114 via the CN network 116.

In the embodiment of FIG. 3, since the call is first being attempted using the CDMA signaling protocol, the circuit switched portion 101 of the UE 102 initiates the call by sending an Origination message to the MSC 104 at event 202. Typically, the Origination message includes a field called Service Option which indicates the type of service that the mobile device is requesting. For example, Service Option could indicate circuit switched voice. The MSC 104 then sends a Mobile Application Part (MAP) message to the CCCF/NeDS 110 at event 204. The call is rejected so, at event 206, the CCCF/NeDS 110 sends a CDMA Null message to the MSC 104. At event 208, the MSC 104 then sends a rejection message with a rejection reason to the circuit switched portion 101 of the UE 102.

One of skill in the art will recognize that these events are typical of those that might occur when a CDMA-based call is attempted and rejected and that further attempts at placing the call might not be attempted after a traditional rejection message is received. In the current embodiments, however, the rejection message might include a suggestion to reattempt the call in the packet switched domain. More specifically, the deny reason parameter in the rejection message depicted at event 208 can be modified to include a suggestion to reattempt the call in the packet switched domain. For example, the network may reject the request for a circuit switched voice call and can direct the mobile device to initiate a Voice over IP call. When such a suggestion is present, a packet switched call might be attempted at this point, either automatically by the UE 102 or upon an instruction from the user of the UE 102. Alternatively, the UE 102 might be capable of interpreting the rejection message and determining whether the call should be reattempted in the packet switched domain based on the rejection message.

In either case, in the embodiment of FIG. 3, a SIP-based call is attempted when the rejection message is received at event 208. Since the events that occur in the attempt at placing the SIP-based call are substantially similar to those described in regard to FIG. 2, the events will not be described again in regard to FIG. 3.

Figure 4:
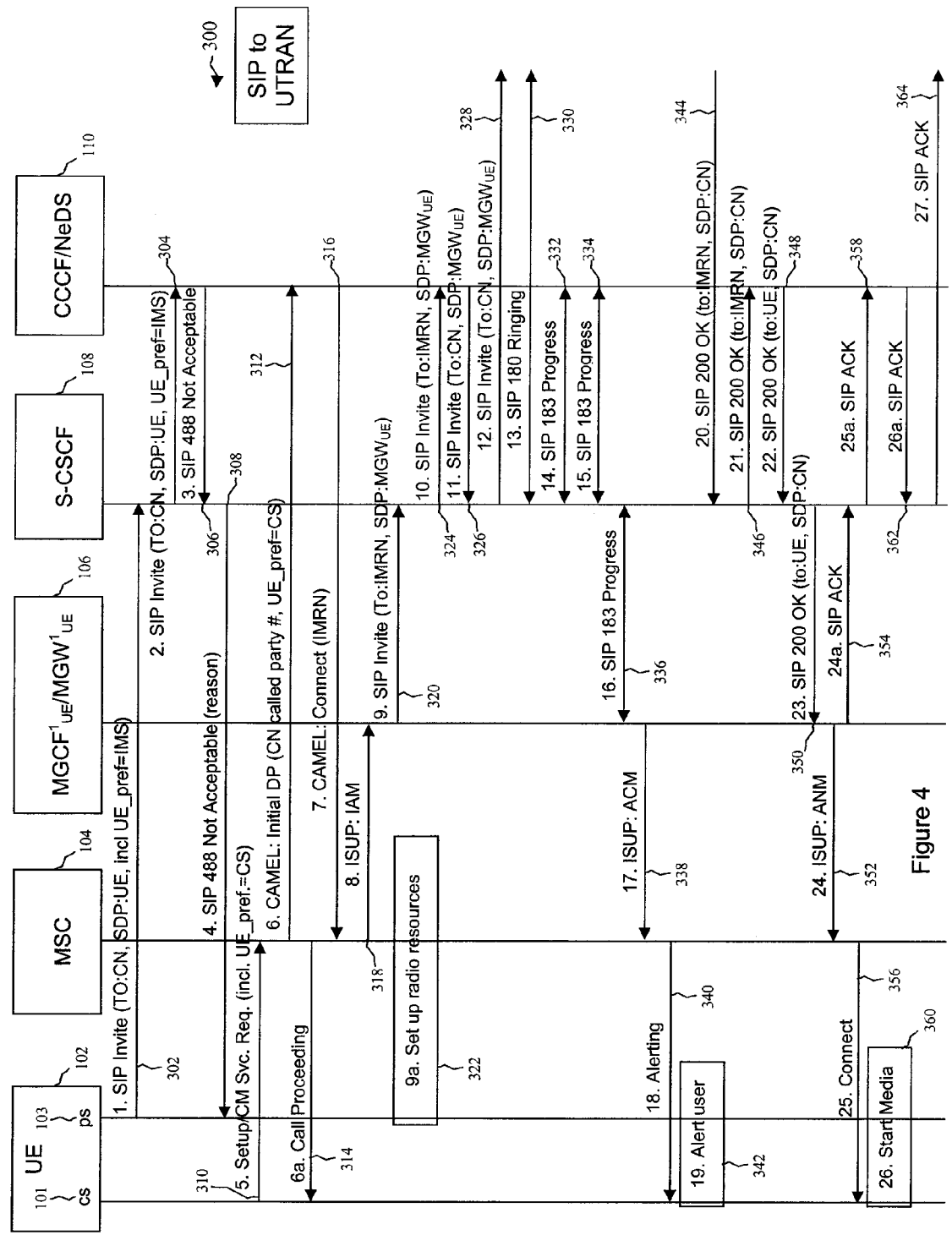
FIG. 4 is a call flow diagram for a call that is initiated in the packet switched domain and reattempted in the circuit switched domain according to an embodiment of the disclosure.

FIG. 4 is a call flow diagram 300 depicting another example of transferring a call from one domain to another when a call is rejected. In this case, the call is attempted in the packet switched domain, rejected, and then reattempted in the circuit switched domain. More specifically, the call is first attempted using the SIP protocol. When the call is rejected in this packet switched domain, the call is then attempted in the circuit switched domain using the UTRAN protocol. In other embodiments, other packet switched and/or circuit switched protocols could be used. As in FIGS. 2 and 3, the UE 102, the MSC 104, the first MGCF/MGW 106, the S-CSCF 108, and the CCCF/NeDS 110 can be considered part of the calling party's network. The called party's network is not shown.

At event 302, the packet switched portion 103 of the UE 102 sends a SIP Invite message to the S-CSCF 108. The S-CSCF 108 then sends a SIP Invite message to the CCCF/NeDS 110 at event 304. At event 306, the CCCF/NeDS 110 rejects the call by sending a SIP Not Acceptable message to the S-CSCF 108. The S-CSCF 108 then sends a SIP Not Acceptable message to the packet switched portion 103 of the UE 102 at event 308.

One of skill in the art will recognize that these events are typical of those that might occur when a SIP-based call is attempted and rejected and that further attempts at placing a call might not be made after a traditional SIP rejection message is received. In the embodiment of FIG. 4, the failure response portion of the SIP rejection message received at event 308 is modified to include a suggestion to reattempt the call in the circuit switched domain. Alternatively, the UE 102 might be capable of interpreting the SIP rejection message and determining whether the call should be reattempted in the circuit switched domain based on the rejection message. In either case, a circuit switched call might then be made, either automatically by the UE 102 or upon an instruction from the user of the UE 102. More specifically, in the embodiment of FIG. 4, a UTRAN-based call is attempted at this point.

The UTRAN-based call is initiated at event 310, where the circuit switched portion 101 of the UE 102 sends a Setup message to the MSC 104. This Setup message is similar to the Setup message sent at event 120 in FIG. 2. At event 312, a CAMEL initialization message is sent from the MSC 104 to the CCCF/NeDS 110. This initialization message is similar to the CAMEL initialization message sent at event 122 in FIG. 2. At event 314, a Call Proceeding message is sent from the MSC 104 to the circuit switched portion 101 of the UE 102. This Call Proceeding message is similar to the Call Proceeding message sent at event 124 in FIG. 2.

In this case, the UTRAN-based call is connected, so the CCCF/NeDS 110 sends the MSC 104 a Connect message at event 316. At event 318, the MSC 104 sends the MGCF/MGW 106 an IS (Integrated Services Digital Network) User Part: Initial Address Message (ISUP: IAM message) to obtain a circuit and exchange call handling information. At event 320, the MGCF/MGW 106 sends a SIP Invite message to the S-CSCF 108. At event 322, the radio resources needed to carry out the call are set up. SIP Invite messages are exchanged between the S-CSCF 108 and the CCCF/NeDS 110 at events 324 and 326. The initialization of the CCCF/NeDS 110 as the VCC anchor for the call also occurs at event 324. The S-CSCF 108 sends a SIP Invite message to the called party at event 328.

At event 330, SIP Ringing messages are exchanged between the S-CSCF 108 and the called party. SIP Progress messages are exchanged between the S-CSCF 108 and the CCCF/NeDS 110 at events 332 and 334. At event 336, a SIP Progress message is exchanged between the MGCF/MGW 106 and the S-CSCF 108. At event 338, the MGCF/MGW 106 translates the SIP message to an ISUP message and sends an ISUP: ACM (Address Complete) message to the MSC 104 indicating that the ISUP: IAM message was received and that a circuit has been established. An alerting message is sent from the MSC 104 to the circuit switched portion 101 of the UE 102 at event 340 and the user is alerted at event 342.

At event 344, the called party sends a SIP OK message to the S-CSCF 108. The S-CSCF 108 and the CCCF/NeDS 110 exchange SIP OK messages at events 346 and 348. At event 350, the S-CSCF 108 sends a SIP OK message to the MGCF/MGW 106. At event 352, the MGCF/MGW 106 translates the SIP message to an ISUP message and sends an ISUP: ANM (Answer Message) message to the MSC 104 indicating that the called party has answered. At event 354, the MGCF/MGW 106 sends a SIP Acknowledgement message to the S-CSCF 108. At event 356, the MSC 104 sends a connect massage to the circuit switched portion 101 of the UE 102. The S-CSCF 108 sends a SIP Acknowledgement message to the CCCF/NeDS 110 at event 358. At event 360, the media for the call start to be exchanged. The CCCF/NeDS 110 sends a SIP Acknowledgement message to the S-CSCF 108 at event 362. The S-CSCF 108 sends a SIP Acknowledgement message to the called party at event 364.

Figure 5A:
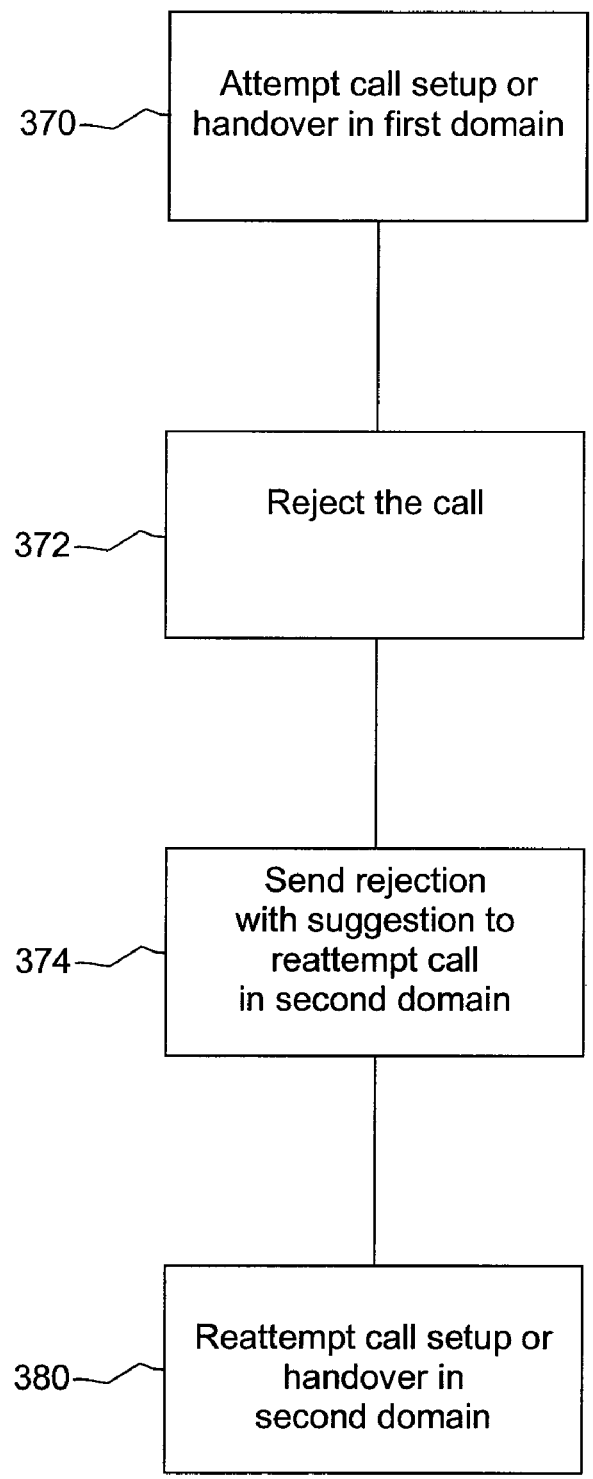
FIG. 5a is a diagram of a method for activating a call in a second domain after the activation is rejected in a first domain according to an embodiment of the disclosure.

FIG. 5a illustrates a method in a wireless communication system 5 for attempting a call in a second domain after the call fails in a first domain. At block 370, a wireless telecommunications call is attempted in either the circuit switched domain or the packet switched domain. At block 372, the call, such as call setup or call handover, is rejected. At block 374, a rejection message is sent to the mobile device that attempted the call. In this embodiment, the rejection message sent by the first domain includes a suggestion that the call be reattempted in another domain. In other embodiments, the mobile device might be able to determine, based on the rejection message, to reattempt the call in another domain. At block 380, the call is reattempted in the second domain. For example, if the call had originally been attempted in the circuit switched domain, the call would be reattempted in the packet switched domain.

Figure 5B:
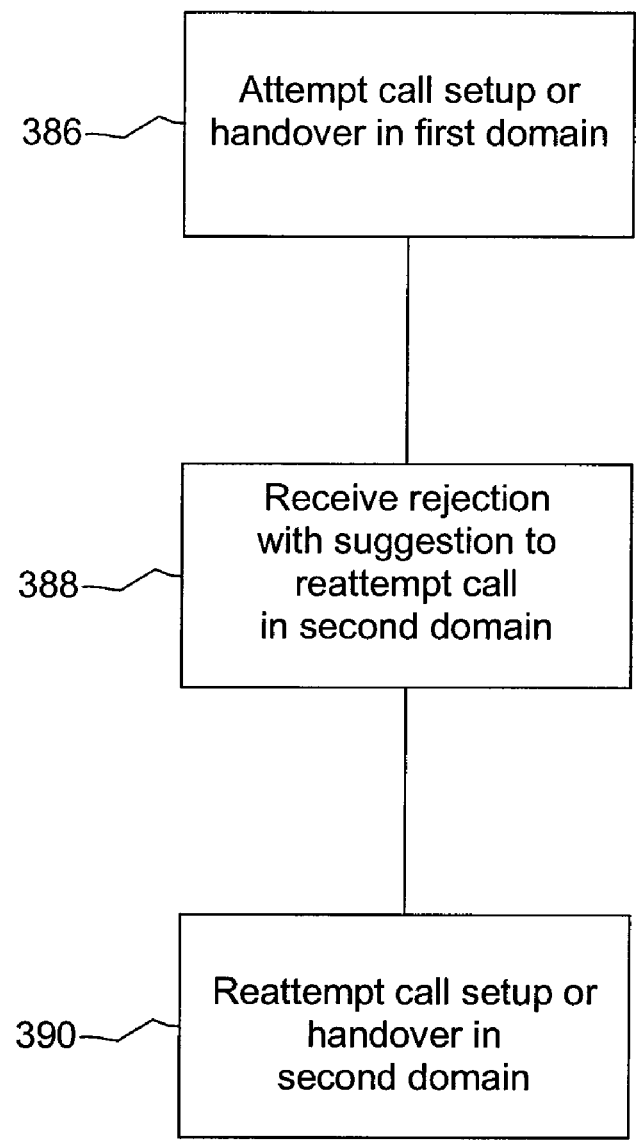
FIG. 5b is a diagram of a method for activating a call in a second domain after the activation is rejected in a first domain according to an alternative embodiment of the disclosure.

FIG. 5b illustrates a method in a mobile device 10 for attempting a call in a second domain after the call fails in a first domain. At block 386, the mobile device attempts to establish a wireless telecommunications call in either the circuit switched domain or the packet switched domain. If the call, such as call setup or call handover, is rejected, the mobile device receives a rejection message at block 388. In this embodiment, the rejection message sent by the first domain includes a suggestion that the call be reattempted in another domain. In other embodiments, the mobile device might be able to determine, based on the rejection message, to reattempt the call in another domain. At block 390, the mobile device reattempts the call in the second domain. For example, if the call had originally been attempted in the circuit switched domain, the call would be reattempted in the packet switched domain.

Figure 6:
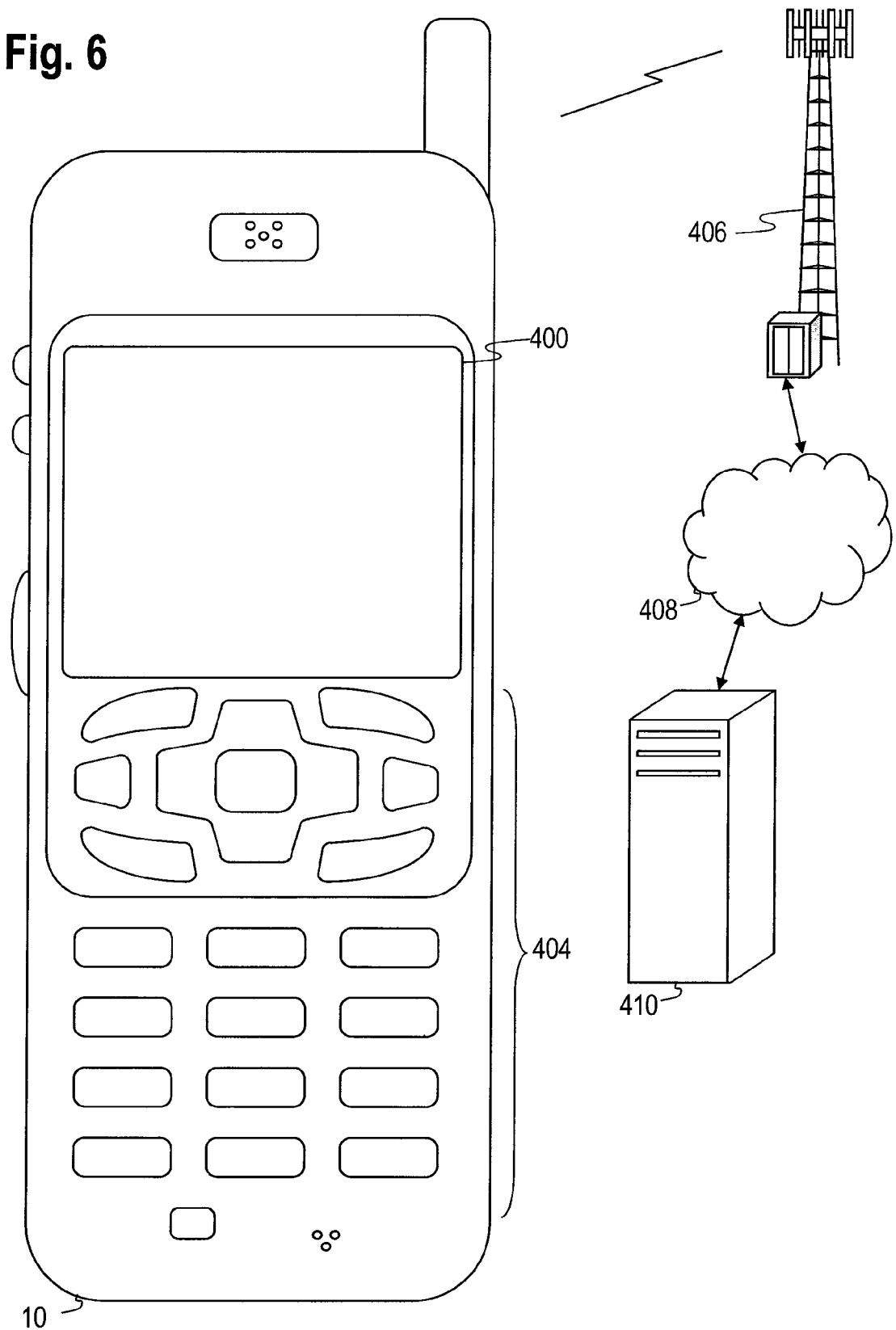
FIG. 6 is a diagram of a wireless communications system including a mobile device operable for some of the various embodiments of the disclosure.

FIG. 6 shows a wireless communications system including one embodiment of the mobile device 10. The mobile device 10 is operable for implementing aspects of the disclosure, but the disclosure should not be limited to these implementations. Though illustrated as a mobile phone, the mobile device 10 may take various forms including a wireless handset, a pager, a personal digital assistant (PDA), a portable computer, a tablet computer, or a laptop computer. Many suitable mobile devices combine some or all of these functions. In some embodiments of the disclosure, the mobile device 10 is not a general purpose computing device like a portable, laptop or tablet computer, but rather is a special-purpose communications device such as a mobile phone, wireless handset, pager, or PDA. In another embodiment, the mobile device 10 may be a portable, laptop or other computing device.

The mobile device 10 includes a display 400. The mobile device 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 10 may present options for the user to select, controls for the user to actuate, and/or cursors or other indicators for the user to direct. The mobile device 10 may further accept data entry from the user, including numbers to dial or various parameter values for configuring the operation of the mobile device 10. The mobile device 10 may further execute one or more software or firmware applications in response to user commands. These applications may configure the mobile device 10 to perform various customized functions in response to user interaction.

Among the various applications executable by the mobile device 10 are a web browser, which enables the display 400 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the mobile device 10 has access to information on various servers, such as a server 410. The server 410 may provide content that may be shown on the display 400.

FIG. 7 shows a block diagram of the mobile device 10. The mobile device 10 includes a digital signal processor (DSP) 502 and a memory 504. As shown, the mobile device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD) 530, which may include a touch sensitive surface, an LCD controller 532, a charge-coupled device (CCD) camera 534, a camera controller 536, and a global positioning system (GPS) sensor 538.

The DSP 502 or some other form of controller or central processing unit operates to control the various components of the mobile device 10 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 10 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 10 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the mobile device 102 and may also enable the mobile device 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 10 to communicate wirelessly with other nearby mobile devices and/or wireless base stations.

The input/output interface 518 may further connect the DSP 502 to the alert 526 that, when triggered, causes the mobile device 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 10 to take digital pictures. The DSP 502 communicates with the CCD camera 534 via the camera controller 536. The GPS sensor 538 is coupled to the DSP 502 to decode global positioning system signals, thereby enabling the mobile device 10 to determine its position. Various other peripherals may also be included to provide additional functions, e.g., radio and television reception.

FIG. 8 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 10. Also shown in FIG. 8 are a web browser application 608, a media player application 610, and Java applets 612. The web browser application 608 configures the mobile device 10 to operate as a web browser, allowing a user to enter information into forms and select links to retrieve and view web pages. The media player application 610 configures the mobile device 10 to retrieve and play audio or audiovisual media. The Java applets 612 configure the mobile device 10 to provide games, utilities, and other functionality. A software component 614 might be substantially similar to the domain component 15 of FIG. 1, which is capable of promoting the activation of a call in a second domain upon receiving a rejection message for the activation of a call in a first domain. In other embodiments, the domain component 15, unlike the software component 614, might be a firmware component, a hardware component, or a combination of software, firmware, and/or hardware.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
   a mobile device configured to attempt a call session in a packet-switched domain; and
   a SIP rejection message transmitted to the mobile device upon a failure to connect the call session in the packet-switched domain;
   wherein the SIP rejection message is indicative of a rejection and a reason for the rejection of the call session in the packet-switched domain; and
   wherein the mobile device is configured to determine whether to reattempt the call session in a circuit-switched domain based at least in part on the reason for the rejection, and if so determined, the mobile device is operable to reattempt the call session in the circuit-switched domain.

2. The system of claim 1, wherein the call session is one of a session initiation and a session handover.

3. The system of claim 1, wherein a domain component in the mobile device interprets the SIP rejection message and determines whether to make the call session in the circuit-switched domain.

4. The system of claim 1, wherein the mobile device automatically reattempts the call session in the circuit-switched domain upon receipt of the SIP rejection message.

5. The system of claim 1, wherein the mobile device, upon receipt of the SIP rejection message, offers a user of the mobile device an option of reattempting the call session in the circuit-switched domain.

6. The system of claim 1, wherein when the failure occurs during a handover, the SIP rejection message is sent to the mobile device when the call session is anchored at a voice call continuity (VCC) server.

7. A dual mode mobile device operable to communicate in a packet-switched domain and a circuit-switched domain, the dual mode mobile device comprising:
   an antenna capable of receiving a SIP rejection message upon a failure to initiate a call session in the packet-switched domain;
   a storage device to store instructions; and
   a processor, such that responsive to execution of the instructions and responsive to receiving and interpreting the SIP rejection message, the processor is configured to determine whether to reattempt the call session in the circuit-switched domain,
   wherein the SIP rejection message is indicative of a reason for a rejection of the call in the packet-switched domain, and
   wherein the determination whether to reattempt the call session in the circuit-switched domain is based at least in part on the reason for the rejection, and if the processor so determines, the mobile device is operable to reattempt the call session in the circuit-switched domain.

8. The device of claim 7, wherein the call session is one of a session initiation and a session handover.

9. The device of claim 7, wherein the SIP rejection message includes a suggestion to attempt the call session in the circuit-switched domain.

10. The device of claim 7, wherein the processor is further programmed to promote providing a user of the mobile device an option of reattempting the call session in the circuit-switched domain.

11. The device of claim 7, wherein the SIP rejection message follows a messaging protocol for at least one of:
   a Code Division Multiple Access (CDMA) message;
   a Universal Mobile Telecommunications System Terrestrial Radio Access Network (UTRAN) message; and
   a Session Initiation Protocol (SIP) message.

12. A method in a mobile device, the method comprising:
   attempting a call session in a packet-switched domain;
   receiving, at the mobile device, a SIP rejection message associated with failure to connect the call session in the packet-switched domain, the SIP rejection message indicative of a rejection and a reason for the rejection of the call session in the packet-switched domain;
   responsive to receiving and interpreting the SIP rejection message, determining whether to reattempt the call session in a circuit-switched domain based at least in part on the reason for the rejection; and
   if so determined, attempting the call session in the circuit-switched domain.

13. The method of claim 12, wherein the call session is one of a session initiation and a session handover.

14. The method of claim 12, further comprising at least one of:
   automatically attempting the call session in the circuit-switched domain upon receipt of the SIP rejection message by the mobile device, the mobile device being operable to receive and interpret the SIP rejection message; and
   offering a user of the mobile device an option of making the call session in the circuit-switched domain upon receipt of the SIP rejection message by the mobile device.

15. The method of claim 12, wherein, when the rejection did not occur because of a technology-related issue, the SIP rejection message does not promote attempting the call session in the circuit-switched domain.

16. The method of claim 12, wherein determining whether to reattempt the call session in the circuit-switched domain is based on whether the reason for the rejection of the call session in the packet-switched domain is associated with a technology-related issue.

17. A method in a mobile device, the method comprising:
attempting a call session in a packet switched domain by sending a Session Initiation Protocol (SIP) Invite message;
receiving, at the mobile device, a SIP rejection message associated with failure to connect the call session in the packet switched domain, the rejection message indicative of a rejection and a reason for the rejection of the call session in the packet switched domain;
responsive to receiving the SIP rejection message, interpreting the SIP rejection message to determine whether to reattempt the call session in a circuit switched domain based at least in part upon the reason for the rejection; and
if so determined, reattempting the call session in the circuit switched domain.

18. The method of claim 17, wherein the call session is one of a session initiation and a session handover.

19. The method of claim 17, further comprising at least one of:
automatically reattempting the call session in the circuit switched domain upon receiving the SIP rejection message; and
offering a user of the mobile device an option of making the call session in the circuit switched domain upon receiving the SIP rejection message.

20. The method of claim 17, wherein, when the rejection did not occur because of a technology-related issue, the mobile device determines not to reattempt the call session in the circuit switched domain.

21. The method of claim 17, wherein the SIP rejection message is a (SIP) "Not Acceptable" message.

* * * * *

UNITED STATES PATENT AND TRADEMARK OFFICE
CERTIFICATE OF CORRECTION

| | | |
|---|---|---|
| PATENT NO. | : 7,995,562 B2 | Page 1 of 1 |
| APPLICATION NO. | : 11/679044 | |
| DATED | : August 9, 2011 | |
| INVENTOR(S) | : Rene W. Purnadi et al. | |

It is certified that error appears in the above-identified patent and that said Letters Patent is hereby corrected as shown below:

Claim 21, Col. 16, Line 18, replace "(SIP)" with -- SIP --

Signed and Sealed this
Twentieth Day of September, 2011

David J. Kappos
*Director of the United States Patent and Trademark Office*